June 8, 1965   J. RUDELICK   3,187,771
CONTROL VALVE MECHANISM
Filed Dec. 13, 1961   5 Sheets-Sheet 1

INVENTOR
John Rudelick
ATTORNEY

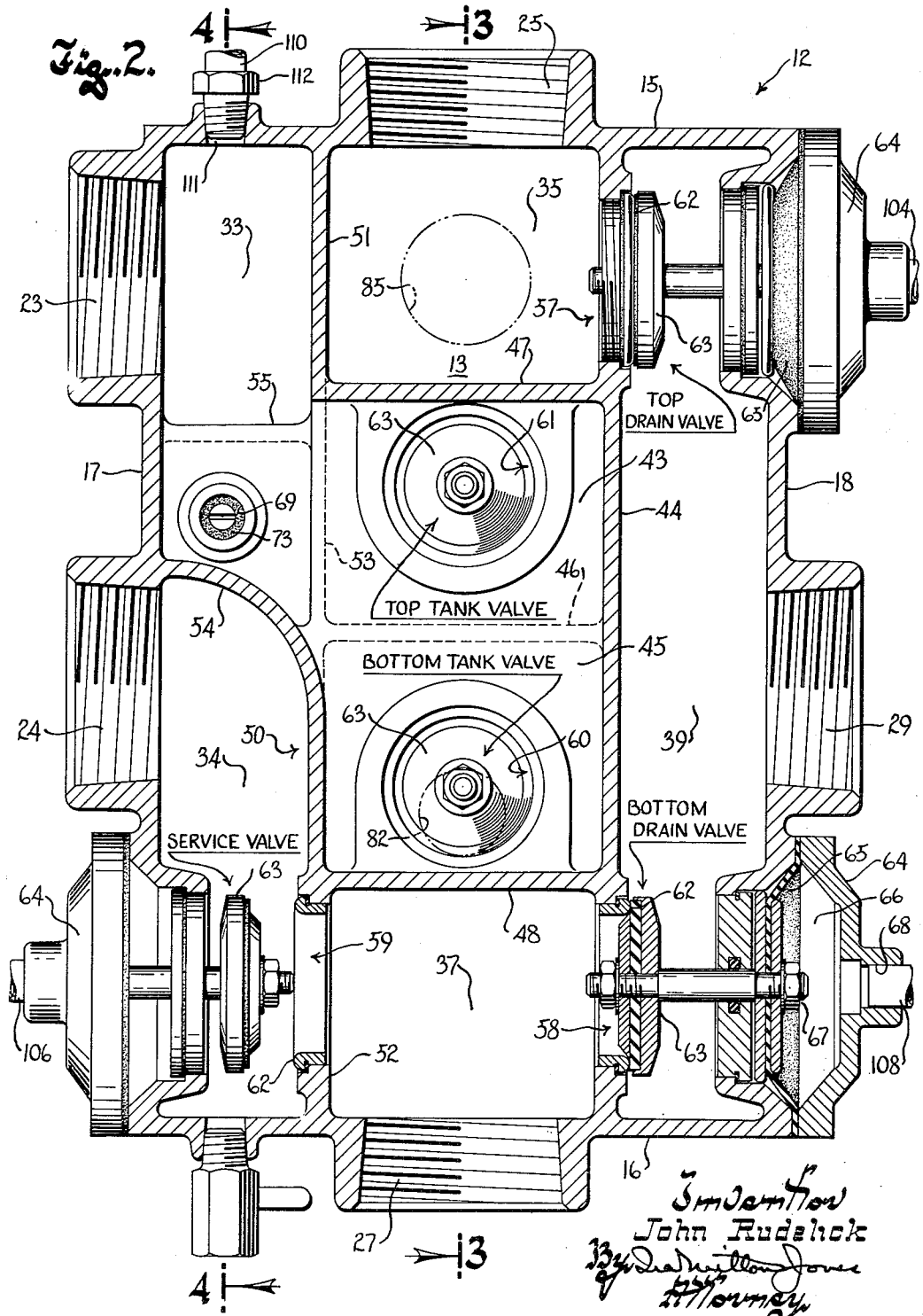

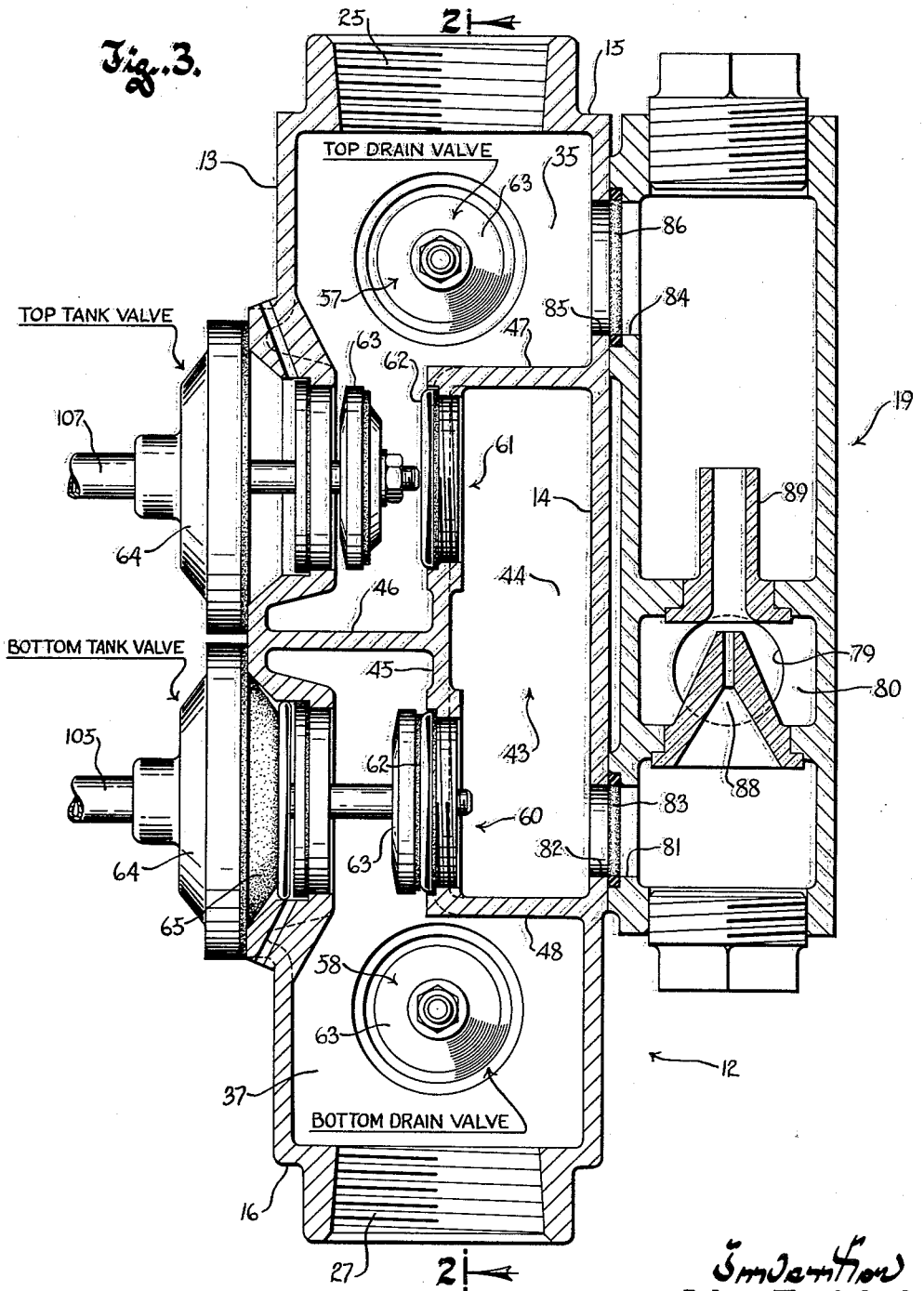

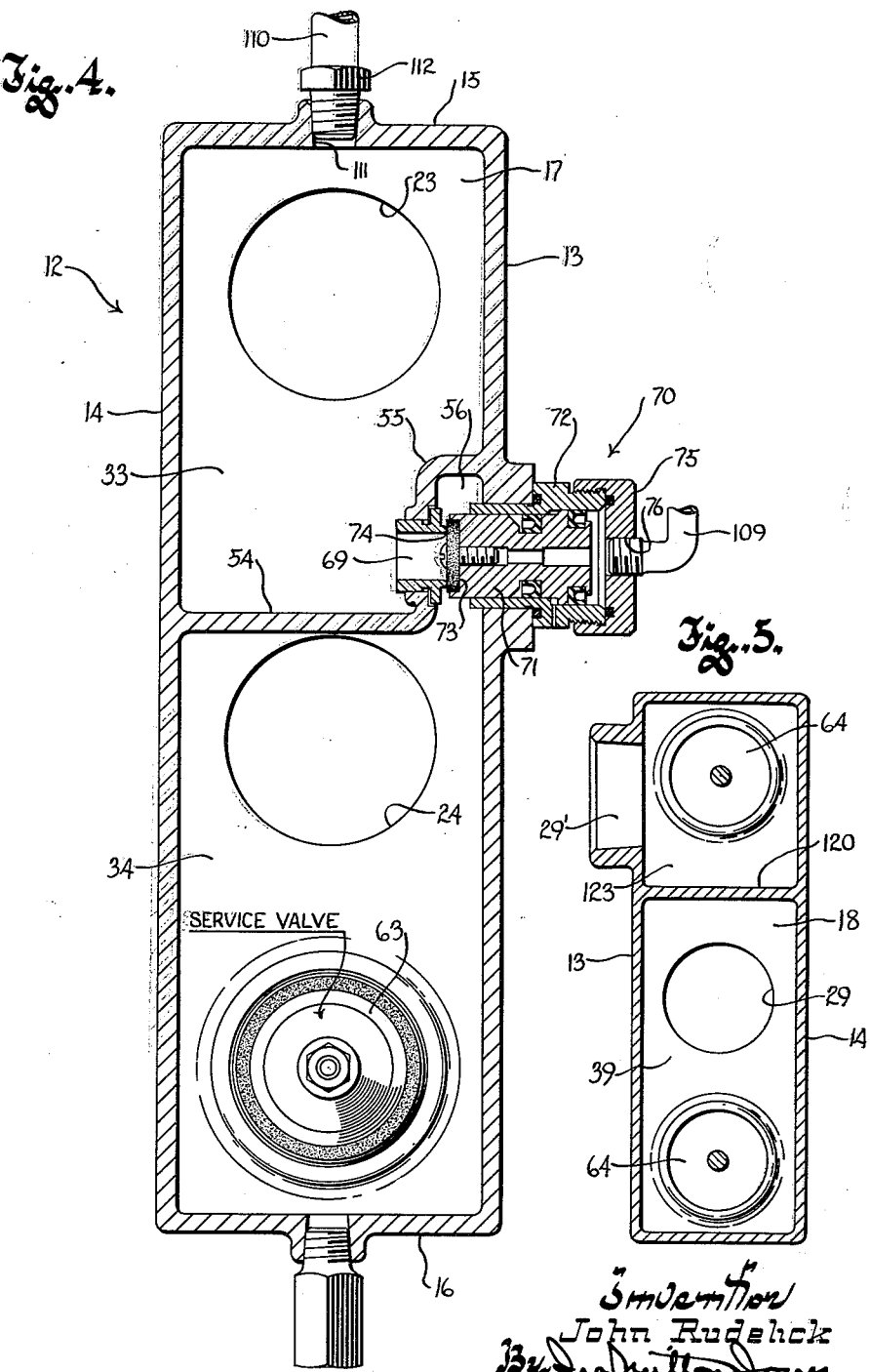

| MAIN VALVE PORTS | SERVICE | BRINE | BACKWASH | RINSE |
|---|---|---|---|---|
| 57- TOP DRAIN VALVE | CLOSED | CLOSED | OPEN | CLOSED |
| 60- BOTTOM TANK VALVE | CLOSED | CLOSED | OPEN | CLOSED |
| 59- SERVICE VALVE | OPEN | CLOSED | CLOSED | CLOSED |
| 61- TOP TANK VALVE | OPEN | CLOSED | CLOSED | OPEN |
| 69- BY PASS VALVE | CLOSED | OPEN | OPEN | OPEN |
| 58- BOTTOM DRAIN VALVE | CLOSED | OPEN | CLOSED | OPEN |

John Rudelick

United States Patent Office 3,187,771
Patented June 8, 1965

3,187,771
CONTROL VALVE MECHANISM
John Rudelick, Milwaukee, Wis., assignor to Bruner Corporation, Milwaukee, Wis., a corporation of Wisconsin
Filed Dec. 13, 1961, Ser. No. 159,011
2 Claims. (Cl. 137—599.1)

This invention relates to valve mechanisms and has more particular reference to control valve mechanisms of a type that are particularly well adapted for automatic operation to effect control of the service as well as regenerating operations of a water softening system.

When incorporated in an automatic water softening system, a typical control valve mechanism of this invention may be rendered operative to normally direct raw water from a source thereof through a softener tank containing ion exchange material, and to direct the softened water issuing from the tank to a service line. During a regenerating cycle of the system, the control valve mechanism may be rendered operative to effect the successive regenerating steps of brining, slow rinsing, and backwashing, followed by a fast flushing operation to assure that the softener tank will contain only fresh softened water when service operation of the system is resumed.

In general, it is the purpose of the invention to provide a control valve mechanism for water softening systems and the like, which features a number of individual valve units mounted on a unitary and compact valve body to govern passages in the valve body that lead to the various system ports of the valve mechanism.

More specifically, it is a purpose of this invention to provide a control valve mechanism of the character described, which is ideally suited for automatic operation by a pilot mechanism at the dictate of timing means.

Another purpose of the invention is to provide a control valve mechanism which is especially suited for use with water softening systems and which comprises a housing with chambers so arranged therein that but five pilot operated valve units on the housing are able to so control communication between the different chambers as to provide for normal service operation of the system as well as regenerating operation during which the several steps of a regenerating cycle mentioned previously may be automatically performed.

Still another purpose of this invention resides in the provision of a control valve mechanism for water softener systems of the character described, wherein an auxiliary drain port in the body of the mechanism enables backwash fluid that discharges from the body during regeneration of the system to be conducted to an evaporating tank or the like, rather than discharged upon the ground as is now illegal in certain areas of the United States.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate two complete examples of the physical embodiments of the invention constructed according to the best modes so far devised for the practical application of the principles thereof, and in which:

FIGURE 2 is a sectional view taken through FIGURE 3 on the plane of the line 2—2;

FIGURE 3 is a sectional view taken through FIGURE 2 on the plane of the line 3—3;

FIGURE 4 is a sectional view taken through FIGURE 2 on the plane of the line 4—4;

FIGURE 5 is a sectional view illustrating a modified embodiment of the invention, and drawn at a reduced scale;

Figure 1:
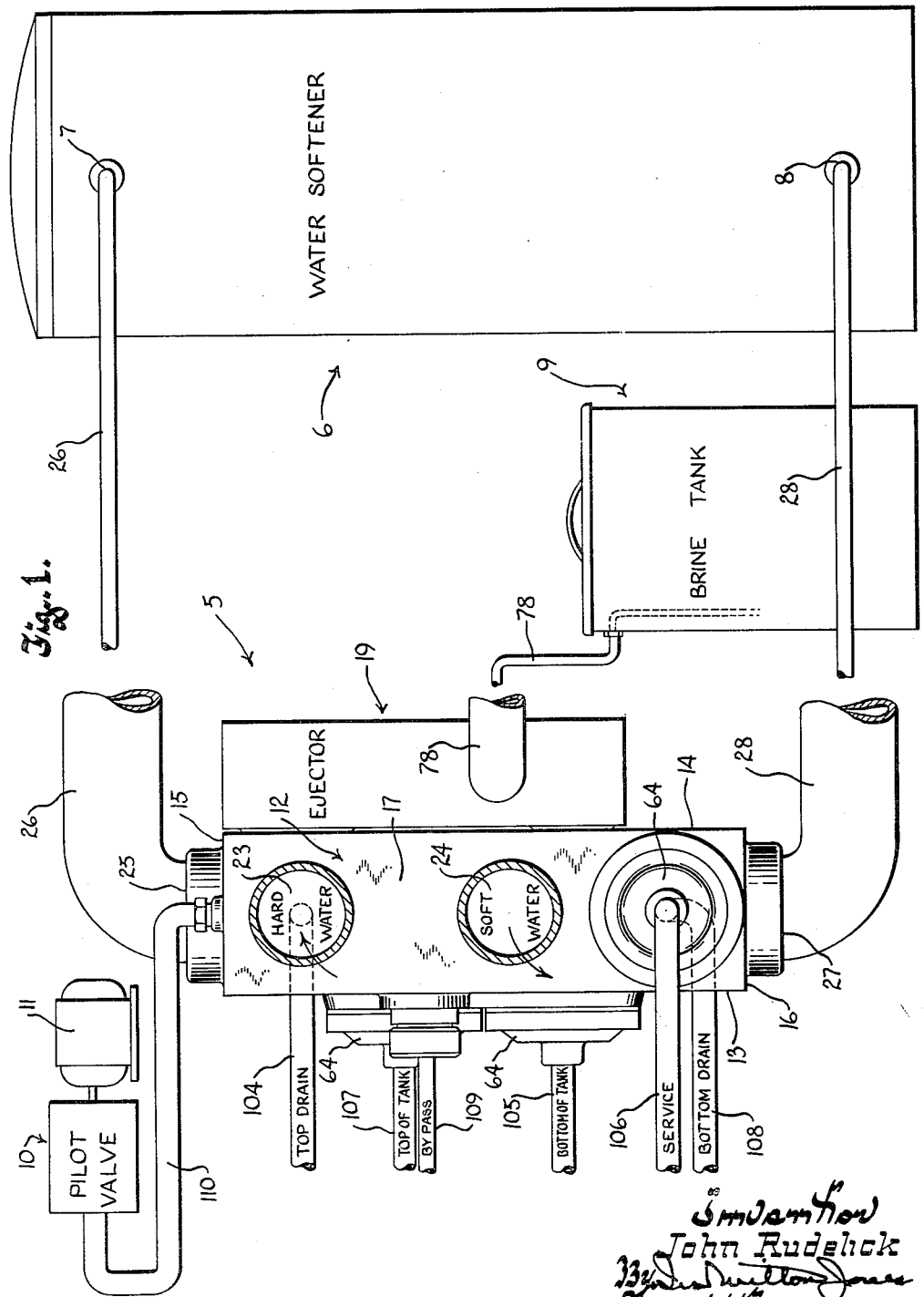
FIGURE 1 is a more or less diagrammatic elevational view of a water softening system governed by a control valve of this invention.

Referring now more particularly to the accompanying drawings, in which like reference characters have been applied to like parts throughout the views, the numeral 5 generally designates a control valve mechanism embodying this invention. As seen in FIGURE 1, the control valve mechanism is adapted for incorporation in an automatic water softening system that includes an upright water softener tank 6 containing a bed of ion exchange material not shown, preferably of the synthetic resin type. The tank 6 is provided with top and bottom flow ports 7 and 8, respectively, and the system further includes a brine tank 9 containing a store of salt and a quantity of concentrated brine which is used during regeneration of the ion exchange material in the water softener tank. A pilot valve 10, driven by an electric motor 11, effects actuation of the control valve mechanism at the dictation of a timing device of a conventional type, not shown, to periodically cause regeneration of the system.

The control valve mechanism 5 comprises a shallow or flat upright main housing 12 of substantially rectangular configuration as seen in FIGURE 2. It has opposite spaced apart substantially wide upright front and back walls 13 and 14, respectively, connected at their margins by substantially narrow horizontal walls 15 and 16 at the top and bottom, respectively, of the housing, and upright end walls 17 and 18 at the opposite sides of the housing. An injector housing 19, smaller than the main housing, is bolted or otherwise secured to the back wall 14 of the main housing to form therewith a unitary valve body.

The housing is provided with five external system ports, all located in the narrower walls at the top, bottom and ends of the main housing, and all being internally threaded for connection with pipe lines. One of these is an inlet port 23 that is connectible with a source of raw water to be softened, and the inlet port is located in the end wall 17 near the top of the main housing. The end wall 17 also has a second port 24 therein, located intermediate the inlet port 23 and the bottom of the housing, and this second port is adapted to be connected with a service line to deliver softened water thereto. In addition to the inlet and service ports described, the top wall 15 of the housing has a tank port 25 therein which is adapted to be connected by a duct 26 with the top flow port 7 of the water softener tank.

A similar tank port 27 in the bottom wall 16 of the tank is adapted to be connected to the bottom flow port 8 of the tank by means of a duct 28. Both the top and bottom tank ports 25 and 27 are located substantially centrally of the top and bottom walls 15 and 16, respectively.

In the preferred embodiment of the invention, there is but a single drain port 29, located in the end wall 18 of the main housing, substantially midway between the top and bottom walls and substantially at the level of the service port 24. The drain port 29 is adapted to be connected with a suitable drain line that leads to a sewer or the like.

Each of the external ports of the control valve described communicates with a chamber or compartment inside the main housing. As viewed in FIGURE 2, the inlet port 23 thus communicates with a chamber 33 in the upper left hand side of the housing; the service port 24 communicates with a chamber 34 in the lower left hand side of the housing; the top tank port 25 communicates with a chamber 35 in the upper central portion of the housing; the bottom tank port 27 communicates with a chamber 37 in the lower central portion of the housing; and the drain port 29 communicates with a drain chamber 39 in the right hand side of the housing, and which drain chamber extends for the full height of the housing.

The inlet chamber 33 extends downwardly from the inlet port a short distance along the end wall 17 and then extends inwardly toward the rear central portion of the housing to at all times communicate with a main inlet compartment 43 in the rear of the housing, disposed partly between and partly behind the upper and lower tank chambers 35 and 37, respectively, and laterally between the drain chamber 39 and an upper portion of the service chamber 34.

The compartmentation described results from the unique arrangement of partition means inside the housing. The drain chamber 39, for example, is defined by housing walls which include an upright partition member 44 that is parallel to the adjacent end wall 18 and extends entirely across the housing, from front to back thereof. Note that the partition member 44 is common to and provides one of the walls of the main inlet compartment 43, and also the upper and lower tank chambers 35 and 37. The main inlet compartment 43 is defined in part by an upright partition wall 45 which is intermediate and parallel to the front and back walls 13 and 14, respectively, and which has joined to its medial portion a horizontal partition member 46 that extends forwardly from it to the front wall 13 of the housing. The partition member 46, however, is only as wide as the main inlet compartment 43, and it separates those portions of the upper and lower tank chambers 35 and 37, respectively, that lie forwardly of the main inlet compartment 43 (see FIG. 3). The main inlet compartment 43 also has top and bottom forming partition members 47 and 48, respectively, which are common to the upper and lower tank chambers 35 and 37, respectively, and which extend rearwardly from the upright partition wall 45 to the back wall 14, as best seen in FIGURE 3.

As seen in FIGURE 2, an upright partition wall 50, similar and generally parallel to the partition wall 44, is located in the left side of the housing interior. An upper portion 51 of the partition 50 separates the entrance chamber 33 from the top tank chamber 35, and a lower portion 52 of the partition 50 separates the bottom tank chamber 37 from the service chamber 34. A medial portion 53 of the wall 50 is interrupted to provide free communication between the main inlet compartment 43 and its entrance chamber 33 but separates them from the top tank chamber 35.

In addition, an intermediate portion 54 of the partition wall 50 is curved upwardly and laterally outwardly to the end wall 17 directly above the service port 24 therein so as to isolate the service chamber 34 from the other compartments within the interior of the valve housing. A front portion 55 of the wall 54 is also directed upwardly behind and then forwardly to the front wall 13 so as to leave a more or less narrow space 56 in the housing that is at all times in communication with the service chamber 34 and is located in front of a lower portion of the entrance chamber 33.

In addition to the external ports described, the housing is provided with a number of internal ports in certain of its partition walls, which ports afford communication between the various compartments into which the interior of the housing is divided by the partition members described. Thus, the partition wall 44 has upper and lower ports 57 and 58 therein to respectively communicate the upper and lower tank chambers 35 and 37 with the drain chamber 39. The lower portion 52 of the partition member 50 similarly has a port 59 therein to afford communication between the lower tank chamber 37 and the service chamber 34. In addition, the lower tank chamber 37 is communicable with the main compartment 43 of the inlet chamber 33 through a port 60 in the lower portion of the partition 45, while the upper tank chamber 35 is communicable with the main compartment of the inlet chamber through a similar port 61 in the upper portion of the partition 45.

Each of these internal ports has a sleeve or bushing pressed or screw threaded thereinto (for replaceability) to define a valve seat 62 that faces an adjacent external wall of the housing, and a valve element 63 movable toward and from seating engagement with each of these valve seats provides for selective communication between the chambers common to each port.

Each of the movable valve elements forms a part of a valve unit 64 that is mounted in an exterior wall of the main housing opposite one of the internal ports described. While not essential, each of the valve units has been shown as of the diaphragm operated type with a flexible diaphragm 65 providing a movable wall of a diaphragm chamber 66 on the exterior of the housing. The flexible diaphragm 65 of each valve unit has a motion transmitting connection 67 with the stem of the movable valve element 63 of the unit, and each of the diaphragm chambers has a port 68 through which the chambers may be pressurized to effect inward motion of their respective valve elements 63 in directions to engage them upon their associated seats 62, and to also provide for the exhaust of pressure fluid from the diaphragm chambers to thereby allow unseating of their movable valve elements in consequence of the force which liquid in the housing exerts upon them. The diaphragms 65 thus may be considered as actuators for the valve elements 63.

Though not in all cases essential, the control valve of this invention is also provided with a by-pass port 69 in the upright portion of the partition member 55, to provide for communication between the entrance chamber 33 and the service chamber 34. Communication between these chambers through the port 69 is controlled by a smaller valve unit 70 mounted in the front wall 13 of the main housing. The valve unit 70 has a piston 71 that is received in a cylinder 72 for endwise sliding movement to carry a valve disc 73 on the inner end of the piston toward and from seating engagement with an annular forwardly facing seat 74 surrounding the by-pass port 69.

The port 69 is normally closed by the disc on the piston 71 during service operation of the softener system, but when opened, as during regeneration of the ion exchange material in the water softener tank, makes fresh hard water available to the service line.

The cylinder 72 of the valve unit 70 is secured in the front wall 13 of the housing in any suitable way, and its outer end is closed by a cap 75 having an operating port 76 therein to provide for exhausting and/or pressurizing of the space in the cylinder outwardly of the piston 71.

It should be understood, of course, that the provision of the by-pass valve 70 is an optional feature of the control valve mechanism of this invention, and that normal service operation as well as all of the steps of regeneration including brining, slow rinsing, backwashing and fast rinsing or flushing are adapted to be carried out by suitable actuation of selected ones of the valve units 64.

Figures 6, 7:
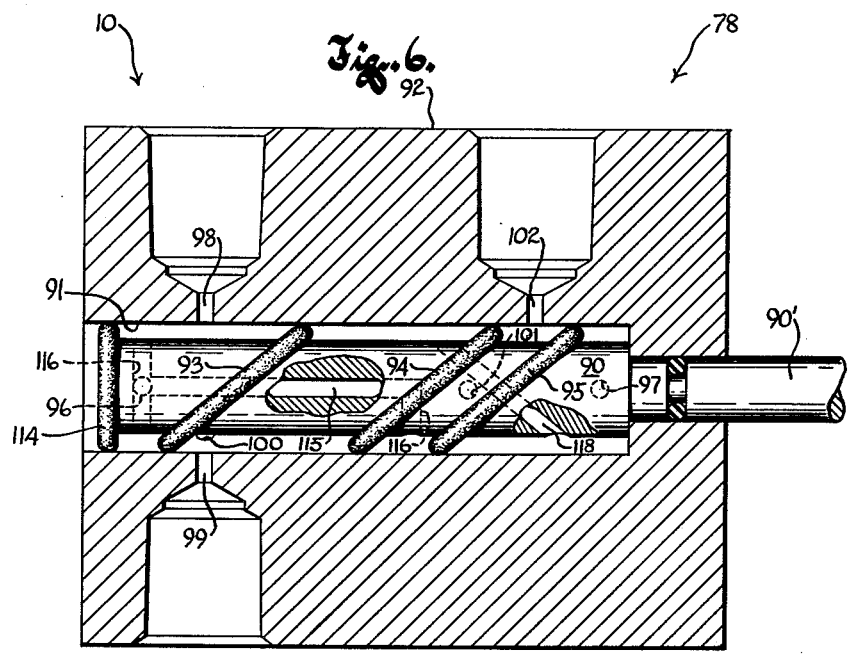
FIGURE 6 is a longitudinal sectional view through a pilot operator for the control valve mechanism of this invention.
FIGURE 7 is a table illustrating how the service, brining, backwashing and rinsing operations of the system are effected.

The movable valve elements 63 of the various valve units 64 are actuatable by their diaphragm operators to positions closing their respective internal ports at the dictation of a pilot valve 78 indicated in the FIGURE 1 diagram and shown in somewhat greater detail in FIGURE 6.

As will be discussed hereafter, the automatic controls operate through the pilot valve to maintain all of the internal ports of the valve mechanism, except ports 59 and 61 closed by their respective valve elements 63 during normal or service operation of the system; to effect brining and slow rinsing as the first steps of a regenerating cycle by causing internal port 58 to be opened along with closure of ports 57, 59, 60 and 61; to effect backwashing after a suitable period of slow rinse by causing internal ports 57 and 60 to be opened along with closure of ports 58, 59 and 61 by their respective valve elements; and to effect fast flushing as the last step of a regenerating cycle by causing ports 58 and 61 to be opened along with closure of ports 57, 59 and 60. The pilot valve further causes the by-pass port 69 to be opened during the entire regenerating cycle, and maintains it closed during normal downflow service operation of the system, at which time only ports 59 and 61 are in their opened conditions illustrated in the drawings.

As stated, the control valve mechanism of this invention is adapted to effect brining of the ion exchange material in the softener tank 6, as the first step of a regenerating cycle, when its port 58 is opened and all the others are closed (except for by-pass port 69). At such times, brine contained in the brine tank 9 is educted therefrom through a brine delivery line 78 that connects with the port 79 of a brine chamber 80 formed in the injector housing 19 on the back wall 14 of the main housing. The injector housing 19 provides an elongated upright duct at the back of the main housing, having an inlet 81 in its lower end portion which at all times communicates with the main inlet compartment 43 through a hole 82 in the back wall 14 of the main housing. An O ring 83 confined between the two housings at their lower zone of communication provides a liquid tight joint between the compartment 43 and the inlet end portion of the injector housing. The upper end portion of the injector housing has an outlet 84 which is at all times in communication with the upper tank chamber 35, through a hole 85 in the back wall 14 of the main housing. An O ring seal 86 similarly confined between the two housings affords a liquid tight seal at their upper zone of communication.

The brine chamber 80 is located intermediate the ends of the injector housing, and brine is educted thereinto in consequence of the rapid flow of fresh hard water entering the injector housing from chamber 43 upwardly through an injector nozzle 88 fixed inside the injector housing with its discharge end in chamber 80. The water issuing from the nozzles flows into a tube or throat member 89 mounted in the injector housing above and coaxial with the nozzle 88. The tube 89 has a larger internal diameter than the nozzle, and substantially directly receives the jet of water issuing therefrom so as to create the sub-atmospheric pressure condition in the brine chamber 80 necessary for eduction of brine thereinto from the brine tank.

Thus it will be apparent that at the start of a regenerating cycle, water entering the main inlet compartment 43 is constrained to flow into the lower end of the injector housing and through the injector nozzle 88, so that water and the educted brine will flow upwardly through the throat 89 and into the upper tank chamber 35, from whence it flows out of the top tank port 25 for downflow passage through the softener tank. The brine effluent issuing from the bottom of the tank is returned to the bottom tank chamber 37 and discharges through the then open port 58 to the drain port 29. It should be noted that water is diverted through the injector housing only at times when there is a pressure difference in chambers 35 and 43, or in other words, when the pressure in the top tank chamber 35 is lower than that in chamber 43. During normal service operation of the system, the pressures in these chambers are the same.

The pilot valve has a spindle 90 which is rotatably received in a bore 91 in the body 92 of the valve, and a reduced end portion 90' of the spindle extends from the body to be driven by the electric motor 11, at the dictation of a timer mechanism, not shown. Three O rings 93, 94 and 95 encircling the spindle at axially spaced locations provide oblique lands thereon which sealingly engage the wall of the bore 91 and control communication between pressure and exhaust ports 96 and 97, respectively, opening to the bore near its ends, and the pressure chambers of all of the valve units on the control valve housing. For this purpose the body 92 is provided with a series of operating ports 98, 99, 100, 101 and 102 of very small diameter, which open to the bore 91 at different axial and circumferential locations with respect to the bore. These ports enable the pilot to selectively supply pressure fluid to or vent the diaphragm chambers of the various valve units 64, in the different combinations necessary to maintain the water softening system either in service operation, or to carry out a regenerating cycle comprising the successive steps of brining, slow rinsing, backwashing and flushing. These regenerating operations are accomplished by rotating the spindle 90 of the pilot valve from its service position shown in FIGURE 6, in one direction and by quarter turn increments to each of three different regenerating positions, from the last of which the spindle may be rotated a final 90° to return it to its service position to conclude regeneration of the system. It is well understood by those skilled in the art that the timing means that governs operation of the spindle drive motor 11 may be adjusted to cause the spindle to remain in each one of its regenerating positions for an appropriate period of time before effecting its advance to the next position.

During normal service operation of the water softening system, the pilot valve is operable to maintain internal ports 59 and 61 of the control valve open, and to maintain internal ports 57, 58, 60 and 69 of the control valve closed. Consequently, fresh hard water under pressure in the entrance chamber 33 flows into the main inlet compartment 43, out of port 61 to the top tank chamber 35, to issue from the top tank port 25 from whence it is conducted to the upper flow port 7 of the water softener tank via duct 26. The softened water issuing from the bottom flow port 8 of the softener tank is returned to the bottom tank port 27 of the control valve through the duct 28, and enters the lower tank chamber 37 in the valve housing for flow through port 59 into the service chamber 34 and the service line that may be connected with the service port 24 thereof.

In order to assure pressurization and/or venting of the proper fluid pressure operated valve units 64 during the service and regenerating operations of the system, the following tube connections are made between the valve units and the pilot ports; the diaphragm chamber for the top drain valve unit 64 associated with the internal port 57, is connected by a tube line 104 with the port 98 of the pilot; the diaphragm chamber for the bottom tank valve unit associated with the internal port 60 is connected by a tube line 105 with the same port 98 of the pilot; the diaphragm chamber of the service valve unit which is associated with the internal port 59 is connected by a tube line 106 with the port 99 of the pilot; the diaphragm chamber of the top tank valve unit which is associated with the internal port 61 is connected by a tube line 107 with the port 100 of the pilot; the diaphragm chamber of the bottom drain valve unit which is associated with the internal port 58 is communicated by a tube line 108 with the port 101 of the pilot; and the cylinder of the by-pass valve 70 is communicated by a tube line 109 with the port 102 of the pilot.

As seen in FIGURES 1 and 2, the inlet or pressure port 96 of the pilot is connected by a tube line 110 with the entrance chamber 33 of the control valve housing, and for this purpose the top wall 15 of the housing has a tapped hole 111 leading into the chamber 33 to receive a fitting 112 for the tube line 110. The drain or exhaust port 97 of the pilot can be connected in similar fashion either with the drain chamber 39 of the control valve or with a separate drain line leading to a sewer or the like.

In the service position of rotation of the pilot spindle, and with the various ports of the pilot opening to the bore 91 thereof in the manner seen in FIGURE 6, fluid under pressure enters the bore 91 through the pressure port 96 at a zone between the oblique land 93 and a cooperating O ring seal 114 on the adjacent extremity of the spindle. Since the pilot port 98 also communicates with this zone and with the diaphragm chambers of the top drain and bottom tank valve units which govern the internal ports 57 and 60, those ports of the control valve will be closed by the movable valve elements 63 associated therewith. Fluid under pressure in the space between the O ring seal 114 and the angled land 93 of the pilot is also conducted to the space in the pilot bore between the two lands 94 and 95, through a bridging passage in the spindle having an axially extending portion 115 with branches 116 at its ends. The pilot port 101 for the diaphragm chamber of the bottom drain valve governing the internal port 58 also opens to the space between lands 94 and 95, and port 58 will thus be closed by its valve unit. In addition, pilot port 102 which connects with the cylinder of the by-pass valve 70 will also be pressurized so that the port 69 of the by-pass valve will be closed by the piston 71 of the by-pass valve.

The two remaining ports 99 and 100 of the pilot are vented through the exhaust port 97 in the service position of the pilot shown in FIGURE 6. This is accomplished by means of a diagonal bore 118 through the pilot spindle, which communicates the exhaust port 97 with the space between the two left hand lands 93 and 94 into which the pilot ports 99 and 100 open. Consequently, since the diaphragm chambers of the service valve unit governing the internal port 59 of the control valve, as well as the diaphragm chamber for the top tank valve unit governing internal port 61 of the control valve are communicated with pilot ports 99 and 100 in the service position of the pilot spindle, water under pressure lifts the movable valve elements 63 off of the seats of their respective ports 59 and 61 to allow the desired downflow service operation of the system.

The table shown in FIGURE 7 designates which of the internal ports of the main or control valve mechanism are opened and which are closed by the pilot valve during service as well as regenerating operation of the softener system. Each of the service, brine, backwash and rinse operations is achieved in a different one of the four angular positions of the pilot spindle, and it will be appreciated that the pilot ports and lands are so arranged as to effect closure and opening of the designated main valve ports in the manner specified in the table.

It should be observed, however, that a preliminary or slow rinsing step can be achieved during regeneration, immediately following the brining step, by maintaining the pilot spindle in the brining position for a suitable period of time after all of the brine has been educted from the brine tank, since at such time, clear hard water will flow through the injector and downwardly through the softener tank to rinse brine therefrom.

The brining and slow rinse steps of a regenerating cycle are terminated and a backwashing operation initiated at the dictation of the timing device, which functions to energize the spindle drive motor 11 for a period sufficient to advance the pilot spindle to a position displaced 180° from that seen in FIGURE 6. During backwashing, the diaphragm chambers of the top drain and bottom tank valve units which govern the internal ports 57 and 60, respectively, will be vented through the pilot exhaust port 97, so that ports 57 and 60 will be open. At the same time the service and top tank valve units governing internal ports 59 and 61, respectively, will have their diaphragm chambers pressurized by the pilot valve so that their respective main valve ports will be closed. Similarly, the diaphragm chamber of the bottom drain valve associated with the internal port 58 of the main valve will have its diaphragm chamber pressurized so that the port 58 will be closed.

Consequently, backwash water flows from the main inlet compartment 43, through port 60 to the bottom tank chamber 37, and through the external port 27 in the bottom of the valve to the bottom of the softener tank. Backwash effluent issuing from the top of the softener tank is returned to the upper tank chamber 35, from whence it flows through the upper drain port 57 to the drain chamber 39, for discharge to waste through the drain outlet 29.

After a suitable period of backwashing, the timer mechanism again effects reenergizing of the electric motor 11 to advance the pilot spindle another one-quarter turn in the same direction of rotation, to initiate the rinsing or fast flushing as the final step of a regenerating cycle, during which any brine and calcium and/or magnesium chlorides remaining in the water softening tank are purged therefrom. While the backwashing operation, as customary, was conducted by flowing fresh water upwardly through the softener tank, the rinsing step is accomplished by flowing fresh water downwardly through the water softening tank.

In the position of the pilot spindle at which rinsing is effected, the pilot effects pressurization of the diaphragm chambers of the top drain valve, the bottom tank valve, and the service valve units, respectively, associated with the internal ports 57, 60 and 59 so that those ports will be closed. The pilot also effects venting of the diaphragm chambers of the top tank valve and the bottom drain valve units, respectively, associated with the internal ports 61 and 58, so that those ports will be open during the rinsing step of the regenerating cycle.

After a suitable period of rinsing, which is of sufficient duration to assure purging of all brine and calcium or magnesium chlorides from the water softener tank, the timer mechanism again functions to reenergize the electric motor to cause return of the pilot spindle to its position seen in FIGURE 6, thus restoring the system to service operation.

In communities or states where it is illegal to discharge backwash water directly on the ground or into dry wells or the like, the main valve housing may be modified as indicated in FIGURE 5, by the provision of a horizontal partition member 120 in the drain chamber 39, at a level just above the drain port 29 therein, along with a second drain port 29′ to serve as an outlet for the upper one of the two drain compartments thus formed by the partition member 120. The outlet 29′ may be connected by means of a duct (not shown) with an evaporating tank or the like into which the backwash water may flow during the regenerating cycle. Such backwash water, of course, enters the top tank port 25 of the main valve housing, flows into the upper tank chamber 35 and through the then open port 57 into the upper drain chamber 123, and out through the backwash discharge port 29′ rather than through the port 29 heretofore described.

From the foregoing description together with the accompanying drawings, it will be evident to those skilled in the art that this invention provides a control valve mechanism which is especially well adapted for pilot operation in an automatic water softening system, and wherein the service, brining, backwashing and rinsing operations are efficiently governed by only five valve units incorporated in a compact housing for the mechanism.

What is claimed as my invention is:
1. In a control valve for water treating systems of the type having a treatment tank with top and bottom flow ports therein:
 (A) a housing having
  (1) opposite upright front and back walls,
  (2) an upright wall closing one end of the housing and having
   (a) an inlet port in an upper portion thereof, and
   (b) a service port below the inlet port,
  (3) an upright wall closing the opposite end of the housing and having
   (a) a drain port therein,

(4) top and bottom walls respectively having
  (a) a top port to connect with the top flow port of a treatment tank, and
  (b) a bottom port to connect with the bottom flow port of a treatment tank;
(B) partition members in the housing cooperating with the walls thereof to define
  (1) an inlet chamber having one portion thereof inwardly adjacent to and communicated with the inlet port, and having a main portion thereof centrally of and on the back wall of the housing, and defined in part by a first upright one of said partition members that is in spaced opposing relation to both the front and back walls of the housing,
  (2) a service chamber inwardly adjacent to and communicated with the service port, and extending downwardly therefrom to the bottom of the housing,
  (3) top and bottom tank chambers spaced from the ends of the housing and located respectively above and below the main portion of the inlet chamber, but having portions directly ahead of the latter and separated therefrom by said first upright partition member, said bottom tank chamber having a portion directly adjacent to the service chamber, and
  (4) a drain chamber at said opposite end of the housing having portions directly adjacent to said top and bottom tank chambers and defined in part by a second upright one of said partition members that is common to the main portion of the inlet chamber and both of said tank chambers;
(C) means on said partition members defining a number of ports each of which provides an annular valve seat that faces an external wall of the housing,
  (1) a first one of said ports being in said first upright partition member and communicating the main portion of the inlet chamber with the top tank chamber,
  (2) a second one of said ports also being in said first upright partition member but communicating the main portion of the inlet chamber with the bottom tank chamber,
  (3) a third one of said ports being in said second upright partition member and communicating the top tank chamber with the drain chamber,
  (4) a fourth one of said ports communicating the bottom tank chamber with the service chamber, and being in a partition member common to said chambers, and
  (5) a fifth one of said ports, also in said second upright partition member, communicating the bottom tank chamber with the drain chamber;
(D) separate valve members in the housing cooperatively associated with each of said ports and movable toward and from port closing engagement with the seat provided thereby; and
(E) valve actuating means mounted on external walls of the housing and operatively connected with each of said valve members.

2. The control valve of claim 1, wherein the back wall of the housing has two ports therein, one opening from the top tank chamber, and the other opening from the main portion of the inlet chamber, and further characterized by:
  (A) means connected with the housing and providing a duct that communicates the inlet chamber with the top tank chamber through said back wall ports, said duct having a hole in a side thereof, and
  (B) an injector in said duct, in eductive relation to said hole, having its inlet at all times in communication with the inlet chamber through said other back wall port and its outlet at all times in communication with the top tank chamber through said first designated back wall port, and through which injector water along with fluid educted into said duct through said hole therein is delivered to the top tank chamber in consequence of closure of said first and second ports for the main portion of the inlet chamber by their respective valve elements.

References Cited by the Examiner

UNITED STATES PATENTS

| | | | |
|---|---|---|---|
| 2,722,514 | 11/55 | Sloan | 210—191 X |
| 2,825,359 | 3/58 | Williams | 137—608 |
| 2,897,968 | 8/59 | Nergaard | 210—191 X |
| 2,906,332 | 9/59 | Rosten et al. | 210—139 X |
| 2,988,107 | 6/61 | Rudelick | 210—191 X |

REUBEN FRIEDMAN, *Primary Examiner.*

HERBERT L. MARTIN, *Examiner.*